United States Patent
Chu et al.

[11] Patent Number: 5,956,334
[45] Date of Patent: Sep. 21, 1999

[54] METHOD FOR INTERFACING A TELEPHONY AND AN ATM NETWORK TO ESTABLISH VOICE COMMUNICATION

[75] Inventors: Thomas P. Chu, Englishtown; Seyhan Civanlar, Middletown Township, Monmouth County; Vikram R. Saksena, Freehold, all of N.J.

[73] Assignee: AT & T Corporation, Middletown, N.J.

[21] Appl. No.: 08/797,150

[22] Filed: Feb. 10, 1997

[51] Int. Cl.[6] .............................. H04L 12/64; H04Q 11/04
[52] U.S. Cl. ........................... 370/352; 370/395; 370/410
[58] Field of Search .................................... 370/352, 353, 370/355, 395, 397, 410, 522

[56] References Cited

U.S. PATENT DOCUMENTS 5,568,475  10/1996  Doshi et al. .............................. 370/352

*Primary Examiner*—Chi H. Pham
*Assistant Examiner*—Maikhanh Tran

[57] ABSTRACT

A method is provided for establishing a communication session over a path supported at least in part by a telephony network and an ATM network. The telephony network includes ingress and egress telephony switches and the ATM network includes ingress and egress ATM switches. A first call setup request is received at the ingress telephony switch from an originating node and the ingress telephony switch selects a first available trunk from the ingress telephony switch to the ingress ATM switch. A communications path is established over the available trunk to the ingress telephony switch. A second call setup request is transmitted from the ingress telephony switch to the egress telephony switch and the egress telephony switch selects a second available trunk from the egress telephony switch to the egress ATM switch. A third party set up command is transmitted from one of the telephony switches to one of the ATM switches requesting establishment of a virtual connection between the ingress and egress ATM switches over the ATM network. A virtual connection is established between the ingress and egress ATM switches. The egress telephony switch connects the second available trunk to a third trunk in communication with a destination node such that the destination node is informed of a request to establish a communication session with the originating node.

17 Claims, 4 Drawing Sheets

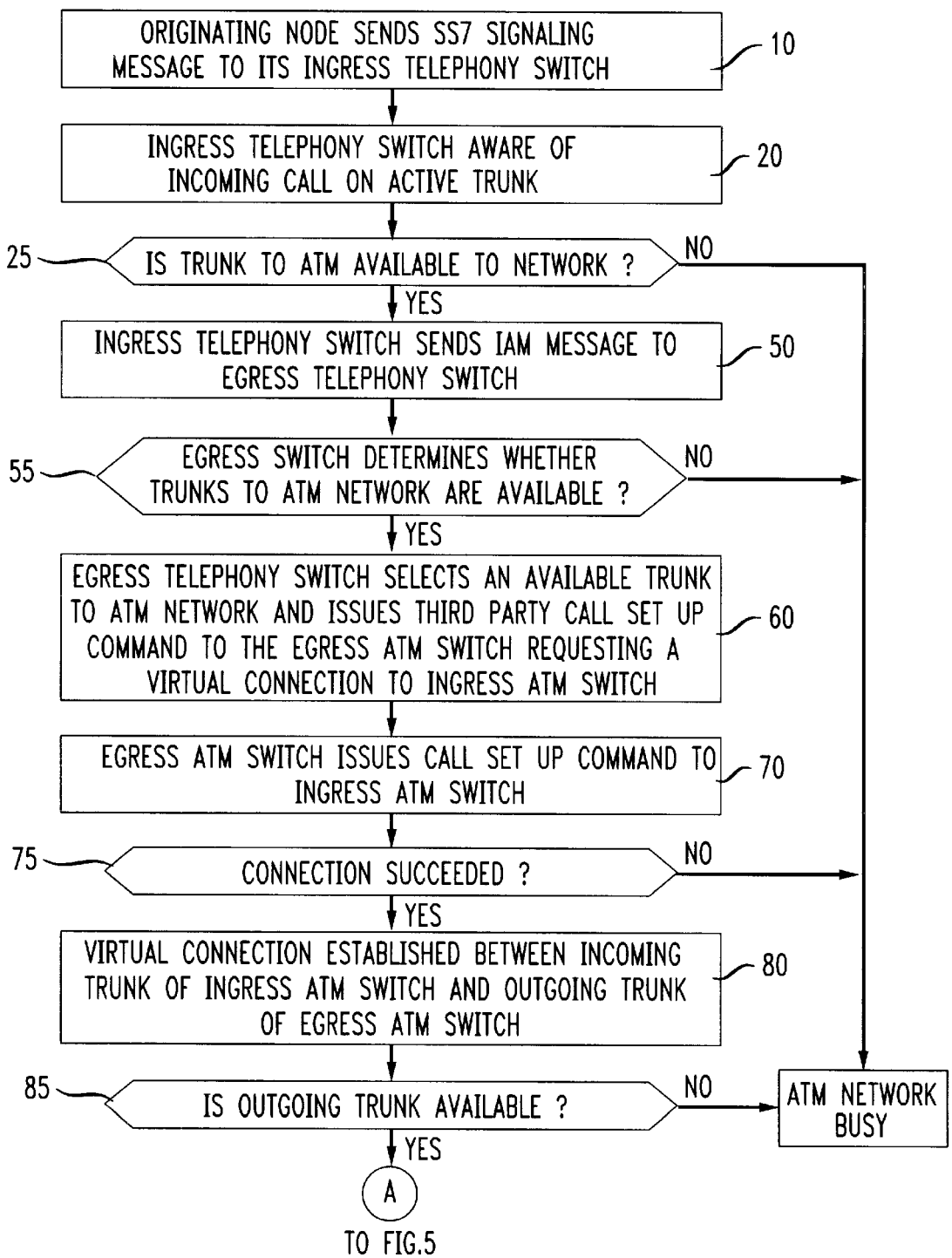

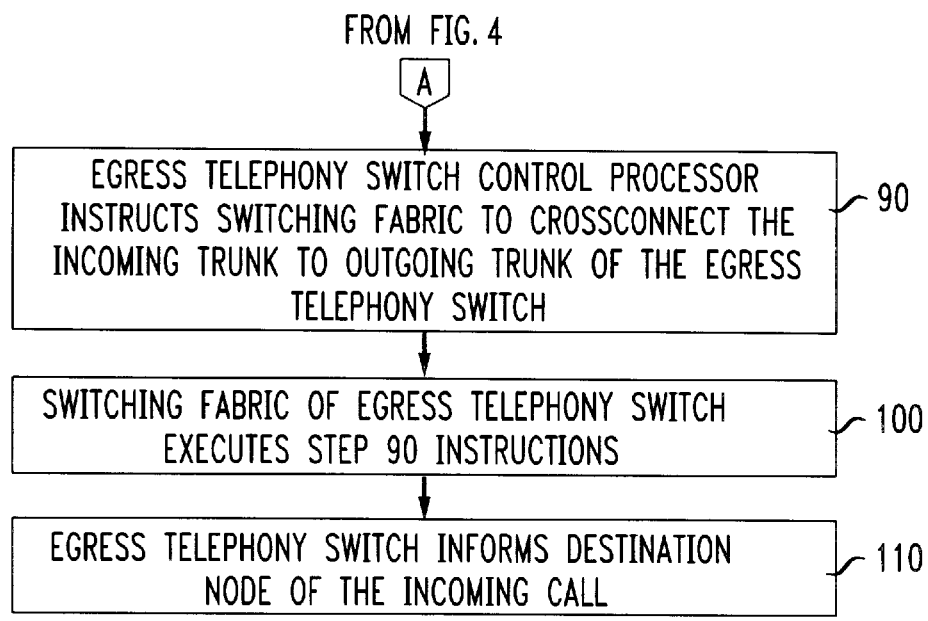
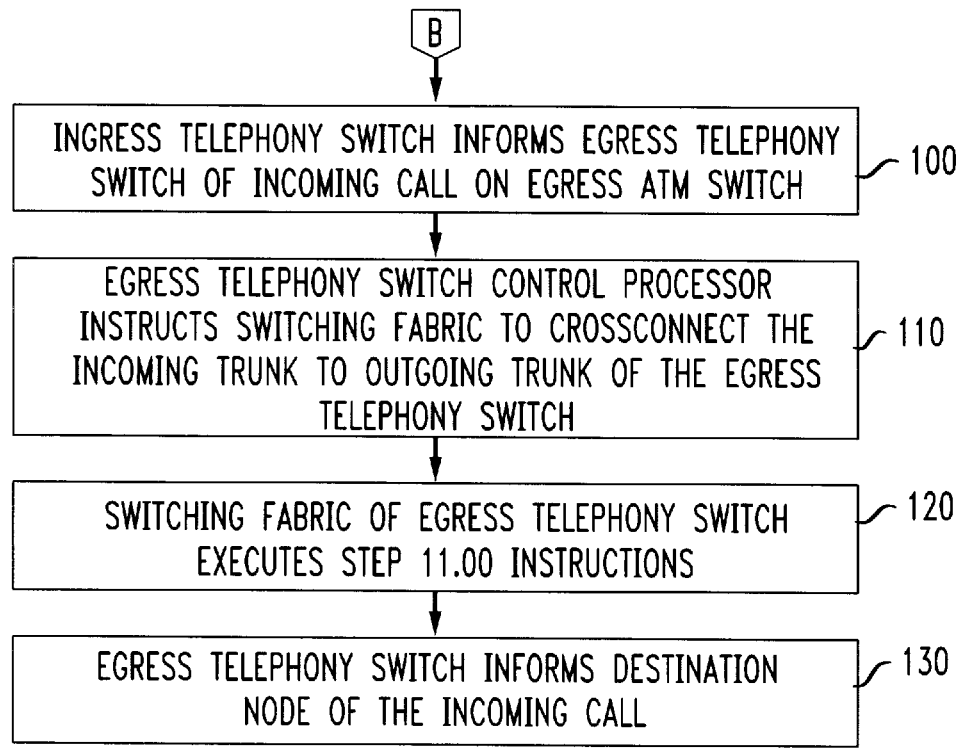

METHOD FOR INTERFACING A TELEPHONY AND AN ATM NETWORK TO ESTABLISH VOICE COMMUNICATION

TECHNICAL FIELD

This invention relates generally to a method for establishing communications paths over both a circuit based public switched telephony network (PSTN) and an Asynchronous Transfer Mode (ATM) network for voice and other circuit switched communications. The method combines the signaling between traditional call processors of the PSTN with call-setup capabilities of an ATM network to establish a connection over both networks. The established communications path could consist of communications segments over several telephony switches in the PSTN as well as Switched Virtual Circuits over several ATM switches.

BACKGROUND OF THE INVENTION

TELEPHONY NETWORKS

The telephony network allows circuit-switched paths to be established between two or more telephony users to carry voice traffic. A telephony switch, which is employed in such a network, consists of two components: (1) a call processor and (2) a switching fabric. The call processor performs signaling functions requesting connections to be established between two nodes while the switching fabric provides the physical paths or routes that allow users to send information to each other. That is, the switching fabric is a cross-connect which connects the traffic from an incoming trunk to an outgoing trunk for establishing a voice path. The activity of the switching fabric is determined by messages it receives from its local call processor. The call processor operates by sending a message to its local switching fabric instructing the switching fabric to cross-connect an incoming trunk to an outgoing trunk to develop a portion of the circuit switched path. For calls that span beyond its scope, the call processor also sends and receives messages to and from other call processors, typically in accordance with a protocol such as the ISDN User Part (ISUP) signaling protocol specified in ITU Recommendations Q.76x, described in ITU Study Group XI, Fascicle VI.8, Specifications of Signaling System No. 7, Recommendations Q.721–766, Geneva, 1988.

FIG. 1 shows an example of a circuit-switched network employing three switches 100, 101 and 102. Each switch consists of a call processor (CP) and a switching fabric (SF), as illustrated in the figure. When an originating node 200 such as a telephone sends a signaling message to destination node 201 to establish a call, a signaling message is sent to CP 100.1 via a signaling network. The signaling message includes the telephone number of the destination node 201. A data table located within CP 100.1 maps the telephone number of the destination 201 to the identifier of the next-hop switch, which is switch 101. Two activities occur in parallel as a result of this mapping procedure. CP 100.1 sending a message to its local SF 100.2 instructing SF 100.2 to connect trunk 105 (which is connected to the originating node 200) to an available trunk connected to the next hop switch 101, which in FIG. 1 is trunk 106. Additionally, CP 100.1 sends an ISUP message to the control processor of the next hop switch 101, which is denoted CP 101.1. The ISUP message informs CP 101.1 that a call request to destination node 201 is located on trunk 106.

As far as the routing of the call is concerned, the message transmitted from CP 100.1 to its local SF 100.2 includes two parameters, the incoming trunk ID, and the outgoing trunk ID. The ISUP message from CP 100.1 to CP 101.1 also includes two parameters: the incoming trunk ID (from SF 100.2 to SF 101.2), and the telephone number of the destination 201.

The above-described process is repeated in a similar manner for subsequent switches on the path. In the exemplary network of FIG. 1 the circuit switched path between originating node 200 and destination node 201 traverses three switching fabrics (SF 100, 101 and 102) to establish a circuit-switched communications path over trunks 105, 106, 107 and 108.

In summary, the establishment of a communications path over a telephony network requires the call processor of each switch to perform table look-ups, to communicate with the call processor of the next switch on the path, and to inform its local switching fabric that a particular pair of trunks should be connected.

ATM

ATM technology is employed in high-capacity applications at transmission rates varying from T1 up to OC12 (622 Mbps). ATM supports integrated services by allowing voice, video and data to be integrated on a single network. Although ATM is used primarily to transmit data, it can emulate a circuit-switched path by allocating dedicated bandwidth on a virtual circuit whose characteristics are dictated by Quality of Service (QoS) requirements. For example, the term "voice over ATM" refers to the transport of voice and voice band data over ATM using ATM Adaptation Layer 1 (AAL1), as specified by the International Telecommunications Union—Telecommunications Standard Sector (ITU-T).

ATM uses virtual connections or circuits to pass data between two nodes. These connections between the nodes are termed "virtual circuits" to distinguish them from dedicated circuits. There are two types of virtual circuits. At each interface, a virtual circuit is identified by a unique virtual connection number. A first type of virtual circuit is the Permanent Virtual Circuit (PVC). For each PVC, there is a predetermined, permanent virtual connection number which is defined at each interface before the virtual circuit is up and running. A second type of virtual circuit is a Switched Virtual Circuit (SVC). SVC connections are set up or disconnected while the network is running. SVC's are set up by utilizing a signaling protocol which assigns a currently available virtual circuit identifier (VCI) to the connection upon call setup. A VCI currently assigned to an existing SVC becomes available when the existing SVC is disconnected.

It is advantageous to migrate to an ATM network because such networks can provide enhanced services that cannot be offered by the conventional telephony network. The integration of multiple services onto a single network also results in cost savings by consolidating bandwidth and centralizing the Operation Administration Management Provisioning (OAM&P) processes.

ATM may be implemented as the backbone of a circuit-switched network by employing either PVC's or SVC's. In FIG. 2, a telephony network having an ATM backbone that employs PVC's is shown. Permanent virtual circuits may appear to be the advantageous alternative because they can reduce the cost of the facilities that are required, since, as illustrated in FIG. 2, facilities may be consolidated at higher rates between telephony switches. However, the PVC approach does not exploit the ATM routing intelligence capabilities. Rather, the PVCs must be administratively provisioned by an operator between the ATM nodes 301 and 302. Voice is converted into ATM cells by an adaptation/mapping function performed on the ingress ATM switch and the reverse process is performed on the egress ATM switch. Each peripheral ATM switch maps the traffic received on a particular trunk onto a particular PVC. The traffic then gets routed across several ATM switches to another peripheral ATM switch. Finally, the egress peripheral switch maps the traffic received on the PVC to a particular outgoing trunk. This alternative does not require the ATM switches to interpret any of the SS7 signaling messages such as ISUP. The mapping of the trunk pairs are static and suffer from the same shortcomings as circuit-switched network because the PVCs are provisioned for peak traffic hours and thus will be underutilized at other times. Also, during overload periods, calls will be blocked even if there is additional bandwidth in the network.

The SVC alternative is more efficient than the PVC alternative in terms of bandwidth utilization because the bandwidth is dynamically allocated. However, the SVC alternative requires a greater amount of overhead processing, which arises from the signaling and interworking processes that occur between telephony signaling and ATM signaling.

ATM networks employ their own routing and signaling schemes which allow them to intelligently route calls between ATM switches without manually configuring the communications paths, as required in the PVC approach. SVCs not only eliminate the need to manually configure paths but also improve network bandwidth efficiency by using circuit resources only while a call is in progress. After the call is completed, the resources are released and made available for subsequent calls.

ATM switches exchange destination information using a protocol specified by the ATM Forum in the Private Network to Network Interface (P-NNI). An ATM network can use P-NNI to perform intelligent routing with dynamically configured call routing tables. These tables are automatically populated within each ATM switch by executing P-NNI. Each switch is informed of the next-hop ATM switch for a given destination by its neighboring switches. This information is analogous to call routing tables maintained within the call processors of a telephony network. Specifically, the signaling in an ATM network (NNI) is analogous to SS7 signaling in the telephony network while UNI is analogous to Q.93 1. In an ATM network virtual paths are established and disconnected using such call signaling procedures.

As telephony networks rapidly increase in size and enhanced services deployed, there is a need to implement technologies such as ATM which will efficiently transport the telephony network load by scaling up the network bandwidth to Gigabit rates. Accordingly, ATM must interact with the call processing intelligence of the telephony network to establish end-to-end switched paths that consist of both a circuit-switched path and a virtual channel on an ATM network. ATM routing schemes will be advantageously employed to determine destination information without the use of manual routing table configurations.

SUMMARY OF THE INVENTION

In accordance with the principles of the invention, the previously mentioned scaling problem can be addressed by employing a method by which ATM switched virtual circuits can be made part of an end-to-end voice call across a circuit-switched telephony network using an additional signaling protocol between the call processor and ATM switches. The ATM network in the telephony backbone allows the ingress and egress telephony switches connected thereto to select an available trunk that connects to its switching fabric to the ATM network. The ATM network backbone is responsible for establishing the ATM switched virtual circuit by using ATM call signaling protocols between the selected available trunks to complete the end-to-end switched path. Accordingly, the telephony switches can select available trunks without being concerned if the selected trunk is on the end-to-end path and thus the telephony switches do not need to be concerned with the actual connection through the network.

In one embodiment of the invention, a method is provided for establishing a communication session over a path supported at least in part by a telephony network and an ATM network. The telephony network includes ingress and egress telephony switches and the ATM network includes ingress and egress ATM switches. A first call setup request is received at the ingress telephony switch from an originating node and the ingress telephony switch selects a first available trunk from the ingress telephony switch to the ingress ATM switch. A communications path is established over the available trunk to the ingress telephony switch. A second call setup request is transmitted from the ingress telephony switch to the egress telephony switch and the egress telephony switch selects a second available trunk from the egress telephony switch to the egress ATM switch. A third party set up command is transmitted from one of the telephony switches to one of the ATM switches requesting establishment of a virtual connection between the ingress and egress ATM switches over the ATM network. A virtual connection is established between the ingress and egress ATM switches. The egress telephony switch connects the second available trunk to a third trunk in communication with a destination node such that the destination node is informed of a request to establish a communication session with the originating node.

BRIEF DESCRIPTION OF THE DRAWING

FIGS. 4–7 are flow charts detailing the steps performed by two embodiments of the present invention.

DETAILED DESCRIPTION

Figure 1:
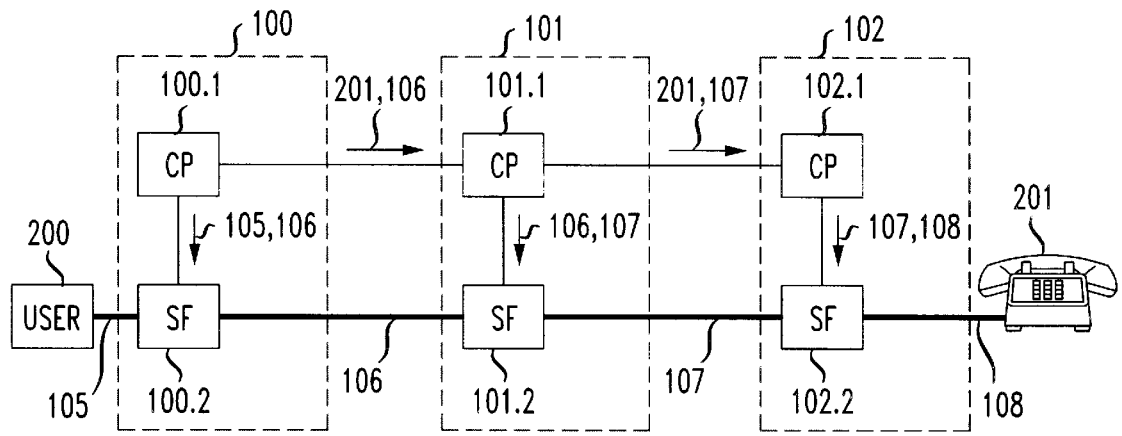
FIG. 1 shows a simplified diagram of a telephony network that employs three circuit switches.
Figure 2:
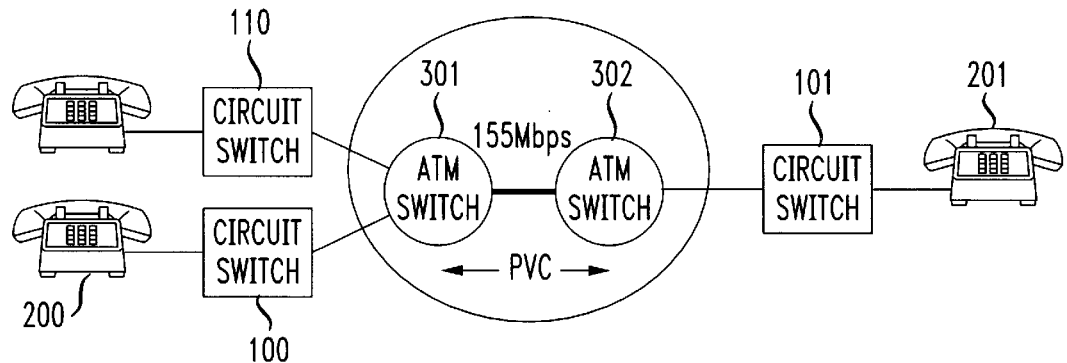
FIG. 2 shows a simplified diagram of a telephony network that includes an ATM backbone network employing permanent virtual circuits.
Figure 3:
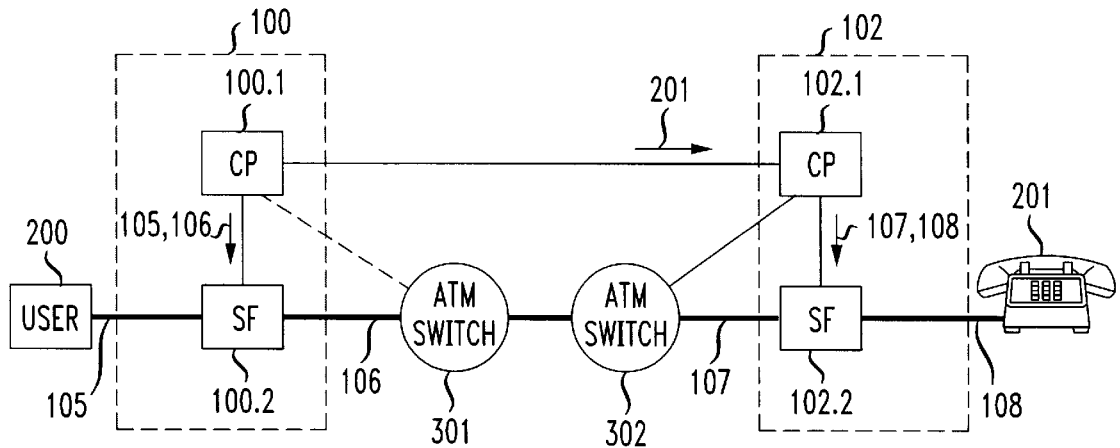
FIG. 3 shows a simplified diagram of a telephony network that includes an ATM backbone network constructed in accordance with the principles of the present invention.

FIG. 3 depicts an exemplary telephony network that employs an ATM backbone. The ATM network is represented by ATM switches 301 and 302. While only two ATM switches are shown, one of ordinary skill in the art will recognize that additional ATM switches may be employed to form a more complex network, including additional switches intermediate to ATM switches 301 and 302. The ATM network communicates with the telephony network through telephony switches 100 and 102. Depending on the direction of the call flow, telephony switches 100 and 102 serve as either ingress switches to the ATM network or egress switches from the ATM network. Telephony switch 100 includes CP 101.1 and SF 100.2. Likewise, telephony switch 102 includes CP 102.1 and SF 102.2. Call processor 100.1 has a message interface to ATM Switch 301 and call processor 101.1 has a message interface to ATM Switch 302. In addition, SF 100.2 is connected to ATM switch 301 and SF 102.2 is connected to ATM switch 302 via TDM circuits. In FIG. 4, it will be assumed that an originating node 200 is placing a call to destination node 201. Accordingly, for illustration purposes only the telephony switch 100 and ATM switch 301 will both be referred to as ingress switches while telephony switch 102 and ATM switch 302 will be referred to as egress switches. The nodes 200 and 201 may be telephony end units or, alternatively, they may be one or more telephony switches which subsequently connect to telephony end units.

A virtual path across the ATM network is established between a pair of selected trunks connected to the ingress and egress telephony switches 100 and 102 by a so-called third party call setup procedure. The third party call setup procedure allows an outside agent to establish a call between two end points when that agent is neither the origination nor the destination point for the call. In this case, the outside agent is the control processor while the originating and destination points are the trunk modules that are connected to the ATM switches. Depending on the particular method that is employed, the control processor of either the ingress or the egress telephony switch 100 and 102 can initiate the third party call set up procedure.

In general, to link the virtual connection in the ATM network to the appropriate circuit segments within the telephony network, certain information must be transferred, including: information from the first CP 100.1 of the ingress telephony switch 100 to CP 102.1 of the egress telephony switch 102; information from the CP 102.1 to the egress ATM switch 302 as part of a third party call set up command; and information transferred between the ingress and egress ATM switches 301 and 302. The actual information content that must be transferred among these elements of the communication system will depend on the particular manner in which the method is implemented. The details of exemplary methods will be presented below. However, in general, conventional ISUP messages typically will be transferred between the control processors. For calls traversing the ATM network backbone, additional information is needed in the Initial Address Message (IAM) of the ISUP protocol, such as the ATM address of ingress ATM switch 301. While other information such as the selected incoming trunk and the destination address are also required, this information is already incorporated into the IAM message.

The third party call set up commands from CP 102.1 of the egress telephony switch to egress ATM switch 302 depend on the particular implementation that is employed. However, this command will typically include at least the ATM address of the ingress ATM switch 301 and the identification of the trunk 106 connected thereto, as well as the identification of the trunk 107 connected to the egress telephony switch 102.

Egress ATM switch 302 initiates a third party ATM call to ingress ATM switch 301 by issuing a set up message. The set up message carries information via a series of parameters referred to as information elements (IE). For example, the address of ingress ATM switch 301 is carried within the called party address IE. The trunk ID of trunk 106 may be carried in an IE referred to as the session ID IE. The Session IE may also contain optional administrative and billing information. It should be noted that the ID of trunk 107 does not need to be transferred over the ATM network.

As previously mentioned, the particular manner in which a call is established over the network will vary and will depend on the user requirements. Presented below are some examples illustrating particular implementations of the inventive method.

EXAMPLE 1

In this example, which is shown in FIGS. 4–5, a call is established when CP 102.1 of egress telephony switch 102 instructs ATM switch 302 to initiate the third party call set up procedure. In step 10 of the method, originating node 200 sends a signaling message (the ISUP Initial Address Message - IAM) to CP 100.1 of ingress telephony switch 100 via the SS 7 signaling network. The signaling message indicates that there is an incoming call on trunk 105 to switching fabric 100.2 of ingress telephony switch 100. Concurrent with step 10, step 20 allocates trunk 105 to the incoming call. In step 50, CP 100.1 sends an enhanced IAM message to CP 102.1 of egress telephony switch 102 using SS7 signaling. The enhanced IAM message includes the ATM address of egress ATM switch 302, the ID of trunk 106, and an instruction to route the call through the ATM network. CP 102.1 recognizes that there is an incoming call from the ATM network upon receiving the IAM message. Accordingly, in step 60, CP 102.1 selects an available trunk from the ATM network (e.g., trunk 107) which is connected to egress ATM switch 302. CP 102.1 then issues a third party call set up command to egress ATM switch 302, requesting that a virtual connection (VC) be set up through the ATM network to ingress ATM switch 301. This command also requires that the VC should traverse trunks 107 and 106. In step 70, egress ATM switch 302 issues a conventional call set up command to ingress ATM switch 301. This command directs the call over trunk 106 and includes other optional administrative information as well. In step 80, the VC is established between trunk 106, which is an incoming trunk to ingress ATM switch 301 and trunk 107, which is an outgoing trunk from egress ATM switch 302. Since the VC is used to transfer circuit traffic, constant bit rate service employing ATM adaptation layer 1 is used as specified in ATMF and ITU standards. CP 102.1 of egress telephony switch 102 subsequently instructs switching fabric SF 102.2 to cross connect trunks 107 and 108 in step 90. In step 100, SF 102.2 executes the instructions from CP 102.1 by connecting trunk 107 and trunk 108. Finally, in step 110, CP 102.1 of egress telephony switch 102 informs node 201 that there is an incoming call on trunk 108.

The inventive method as illustrated in this first example is advantageous because of its straightforwardness and because the control processors of the telephony switches select the trunks to be employed, which are connected to their respective switching fabrics. Since each control processor knows the status of the trunks connected to its own switching fabric, an available trunk will be virtually always selected. Thus, the probability of contention and blocking is minimized. One potential disadvantage of this particular method is that a new IE (or a different encoding of an existing IE) is required to carry the ATM address of ingress ATM switch 301 as well as the trunk ID of trunk 106.

EXAMPLE 2

Figure 6:
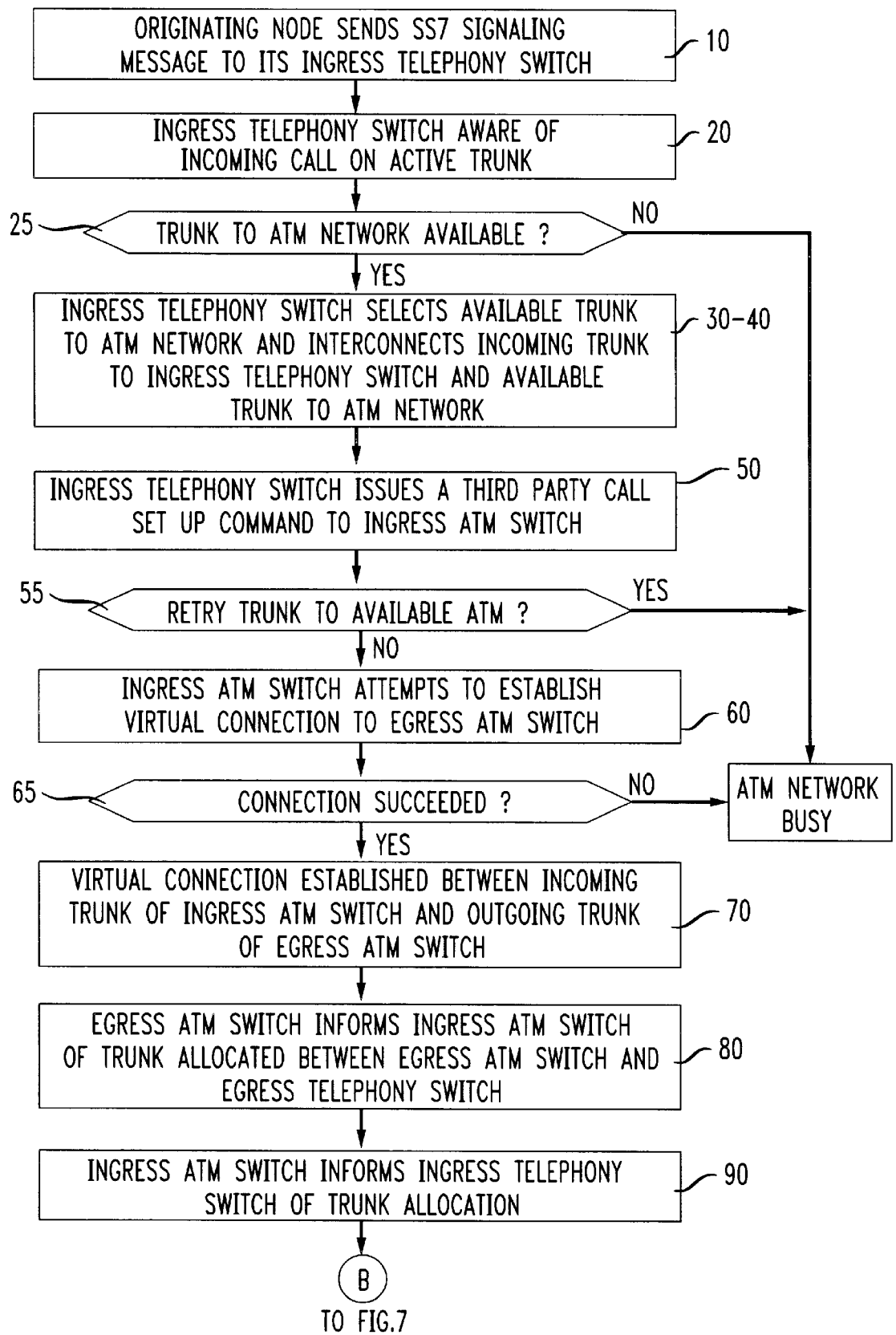

In this example, which is shown in FIGS. 6–7, the third party call setup procedure is initiated by ingress ATM switch 301 on instructions from CP 100.1. Steps 10, 20, and 25 of this example proceed in accordance with steps 10, 20, and 25 of example 1. In steps 30 and 40 CP 100.1 selects an available trunk to ingress ATM switch 301 and SF 1002. interconnects tis available trunk to the trunk incoming to the ingress telephony switch 100. In step 50, CP 100.1 instructs, via a third party call set up procedure, ATM switch 301 to establish a virtual connection to ATM switch 302. CP 100.1 also specifies an available trunk to which the virtual connection should be connected. In FIG. 3, the available trunk is trunk 106. In step 60, ATM switch 301 issues a conventional call setup command to switch 302. The command indicates that the destination ATM address for the call is a circuit connected to egress telephony switch 102. In step 70, egress ATM switch 302 selects an available trunk to SF 102.2 and establishes the appropriate connection. Accordingly, the virtual circuit through the ATM network is established, connecting trunk 106 and trunk 107. In step 80, a connect message from egress ATM switch 302 to ingress ATM switch 301 specifies that trunk 107 is allocated to ATM switch 302. Ingress ATM switch 301 in turn passes this information to CP 100.1 in step 90. In step 100, CP 100.1 transmits an IAM message to inform CP 102.1 specifying that a call is incoming from the ATM network on trunk 107 of egress ATM switch 302. In step 110, CP 102.2 directs SF 102.2 to cross connect trunks 107 and 108, which is executed by SF 102.2 in step 120. Finally, in step 130, CP 102.1 informs destination node 201, via a IAM message, that there is an incoming call on trunk 108.

One advantage provided by this second example of the inventive method is that it is not necessary to employ a new information element (IE) within the ISUP messages. Additionally, aside from the session ID, which is common to all the examples of the method presented herein, the ATM signaling messages also do not require a new IE. However, the blocking probability is slightly higher in this example than in example 1. This potential drawback arises because CP 100.1 must determine the particular ATM switch that is to be employed as the egress switch of the ATM backbone. When CP 100.1 makes this determination, it generally does not have information regarding the load condition of ATM switch 302. As a result, ATM switch 302 may be busy while other ATM switches that could otherwise serve as egress switches may be available. It should be noted that blocking in this context does not imply that the call is blocked. Rather, it means that CP 100.1 must attempt to set up the call through another ATM switch, resulting in an increased call set up time.

EXAMPLE 3

In this example, as in example 2, ingress ATM switch 301 executes the third party call set up procedure. Steps 1–5 of this example proceed in accordance with steps 1–5 shown in example 2. In step 6, CP 101.1 informs CP 102.1 to expect an incoming call from the ATM network with an assigned call correlation identifier. At the same time, in step 7, ATM switch 301 issues a call set command to ATM switch 302. The destination ATM address in the command indicates that the call requires a circuit to a egress telephony switch 102. In addition, the assigned call correlation identifier is carried along with the ATM call setup message. In step 8, ATM switch 302 selects an available trunk to SF 102.2 and directs the incoming call thereto. The virtual connection connecting trunk 106 and trunk 107 through the ATM network is thus established. In step 9, ingress ATM switch 301 informs CP 102.1 of an incoming call from the ATM network on trunk 107 with the assigned call identifier. This call identifier is used to associate the incoming call with the IAM message from CP 101.1. In step 10, CP 102.1 instructs SF 102.2 to cross connect trunks 107 and 108 while in step 11 SF 102.1 executes this instruction. In step 12, CP 102.1 informs originating node 201, via an IAM message, that there is an incoming call on trunk 108.

The primary advantage of this example of the inventive method is that it is extremely straightforward. A potential drawback of this method is that, as in method 2, CP 100.1 must determine the particular ATM switch that is to be employed as the egress switch from the ATM backbone. Hence, the blocking probability in this example is slightly higher than in example 1. In addition, the logic required of CP 102. is more complex than in the previous examples because it must co-ordinate the IAM message from CP 100.1 and the messages from ATM switch 302 through the call correlation identifier. The protocol between the ATM switch and CP 102.1 is also more complex because the ATM switch must inform the CP of an incoming call.

We claim:

1. A method for establishing a communication session over a path supported at least in part by a telephony network and an ATM network, said telephony network including an ingress and egress telephony switch and said ATM network including an ingress and egress ATM switch, said method comprising the steps of:

receiving at the ingress telephony switch a first call setup request from an originating node, said ingress telephony switch selecting a first available trunk from said ingress telephony switch to said ingress ATM switch;

establishing a communications path over said available trunk to the ingress telephony switch;

transmitting a second call setup request from said ingress telephony switch to said egress telephony switch, said egress telephony switch selecting a second available trunk from said egress telephony switch to said egress ATM switch;

transmitting from one of said telephony switches a third party set up command to one of said ATM switches requesting establishment of a virtual connection between said ingress and egress ATM switches over said ATM network;

establishing said virtual connection between said ingress and egress ATM switches;

wherein said egress telephony switch connects said second available trunk to a third trunk in communication with a destination node such that the destination node is informed of a request that a communication session be established with said originating node.

2. The method of claim 1 wherein the steps of transmitting said second call setup request and said third party setup command are performed concurrently.

3. The method of claim 1 wherein said second call setup request and said third party setup command are correlated via a call correlation identifier.

4. The method of claim 1 wherein an ATM network portion of said path over which said communication session is established is a switched virtual circuit.

5. The method of claim 1 wherein an interface between said ATM switches and said telephony switches is a time division multiplexed interface.

6. The method of claim 1 wherein said ATM network employs a P-NNI routing protocol.

7. The method of claim 1 wherein said originating node is located within said ATM network.

8. The method of claim 1 wherein said destination node is located in said ATM network.

9. The method of claim 4 wherein said switched virtual circuit employs a constant bit rate service.

10. The method of claim 9 wherein said constant bit rate connection employs ATM adaptation layer 1.

11. The method of claim 1 wherein said originating node is located within a second ATM network.

12. The method of claim 1 wherein said destination node is located within a second ATM network.

13. The method of claim 1 wherein said originating node is located within said telephony network.

14. The method of claim 1 wherein a protocol operating between said ATM switches and said telephony switches is a proprietary protocol.

15. The method of claim 1 wherein said destination node is located within said telephony network.

16. The method of claim 1 wherein said originating node is located within a second telephony network.

17. The method of claim 1 wherein said destination node is located within a second telephony network.

* * * * *